United States Patent Office 3,547,852
Patented Dec. 15, 1970

3,547,852
AQUEOUS EMULSION ADHESIVE
Robert L. Burke, Jr., Aiken, S.C., assignor to United
Merchants and Manufacturers, Inc., New York, N.Y.,
a corporation of Delaware
Filed July 5, 1966, Ser. No. 562,838
Int. Cl. C08f 37/18; C09j 7/02
U.S. Cl. 260—29.6
2 Claims

ABSTRACT OF THE DISCLOSURE

A pressure sensitive aqueous emulsion adhesive includes an acrylic ester and other polymer and monomer components whose net effect when the adhesive is applied to a polyvinylchloride-organic plasticizer substrate is to substantially eliminate migration of the vinyl plasticizer and adhesive solvent and thereby substantially eliminate film contraction during ageing.

---

Vinyl films which include ribbons and sheets have been used extensively in industry and the home as a furniture overlay, a substitute for wall paper and the like, and are generally held thereon by means of pressure sensitive adhesives which include rubber-base adhesives and acrylate-base adhesives. For storage and prior to application on a wall or the like the adhesives are usually covered with a release paper. The acrylate adhesives are generally preferred over the rubber adhesives for they are resistant to heat, aging and light. However, it is sometimes undesirable to use acrylate adhesives in combination with vinyl films for overlays because, over a period of time, the acrylate adhesive allows the substrate vinyl film to contract and, therefore, uniformity cannot be maintained. This contraction is believed to be produced by a memory retained by the vinyl film of an original shape and size, and the tendency of the vinyl film to return to such shape and size. Such contraction or shrinkage is especially noticeable where the exposed surface of the vinyl film is embossed or printed with an aesthetic pictorial display.

The industry has been searching for a pressure sensitive adhesive which when applied to vinyl film controls the inherent contracting forces and which substantially eliminates film shrinkage, but, to date, has been unsuccessful. Those learned in the art believe that stresses in the vinyl film overcome the tenacity of the adhesive because the plasticizer in the vinyl film has an affinity for the adhesive and tends to migrate into the adhesive thus leaving voids in the film and, in effect, lubricating the contiguous vinyl and adhesive surfaces. Furthermore, the adhesive solvents currently in use are compatible with the vinyl plasticizer and the solvents tend to migrate into the vinyl thus facilitating the absorption of the plasticizer by the adhesive. Thus, the internal contracting stresses in the vinyl overcome the cohesive properties of the adhesive and the vinyl shrinks.

The problem of migration has been reduced by increasing the molecular weight of the plasticizer through substitution of high molecular weight polymers for the currently used lower molecular weight monomers. However, these high molecular weight polymers are also compatible with the adhesive solvents and migration is still experienced. It can be said that the art would be advanced by the substantial elimination of the fluid flow of the plasticizer and solvent between the adhesive and the vinyl layers. The invention recognizes that what is needed is an adhesive suspended in a continuous phase which is incompatible with the plasticizer so as to substantially eliminate the undesired fluid flow properties between the vinyl and the adhesive layers while retaining the desired adhesive properties. However, such a solvent which is practical in application has not heretofore appeared in the art. Further, the invention recognizes other means for solving the basic problem that is present.

Therefore, an object of this invention is to provide a vinyl film with a pressure sensitive adhesive which substantially eliminates all plasticizer and solvent migration between the respective vinyl and adhesive layers.

Another object of this invention is to provide a pressure sensitive adhesive which, when applied to a vinyl film, is adapted to dimensionally stabilize the vinyl film when the same is adhered to a surface.

A further object of this invention is to provide a pressure sensitive adhesive which can be coated on vinyl film in the form of an aqueous emulsion.

Still another object is to provide a pressure sensitive adhesive for application to vinyl film and which remains both physically and chemically stable after such application.

Yet another object of this invention is to provide a method for coating an embossed vinyl film with a pressure sensitive adhesive which is suspended in a continuous phase.

Yet a further object of this invention is to provide a pressure sensitive adhesive which is suspended in a non-inflammable continuous phase.

Other objects and advantages of this invention will become apparent when the following detailed description is read in conjunction with the appended specification, examples and claims.

Figure 1:
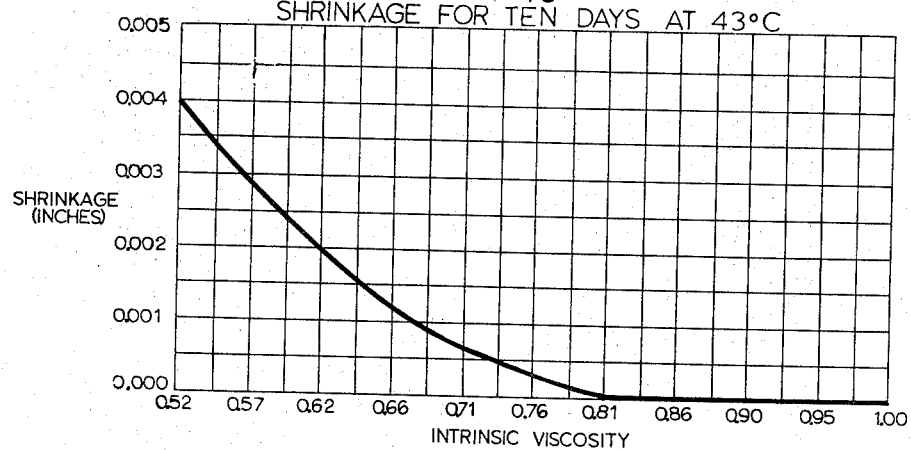
FIG. 1 is a graph plotting intrinsic viscosity against shrinkage for ten days at 43° C. and based on coating the vinyl film directly.
Figure 2:
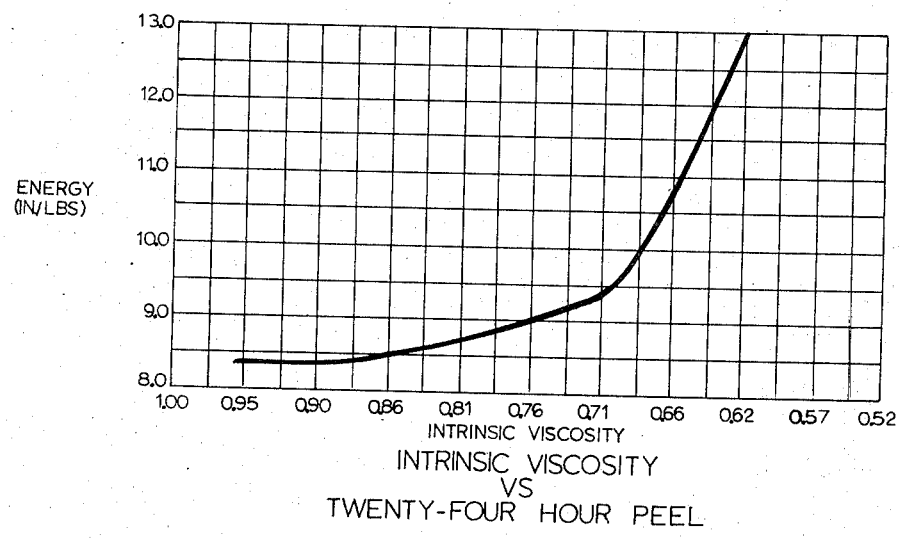
FIG. 2 is a graph plotting intrinsic viscosity against peel strength after twenty-four hours.

In accordance with this invention, vinyl films are coated with a colloidal copolymer which is suspended in a continuous phase and which includes an acrylic ester having the general formula:

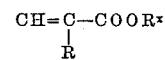

wherein R is hydrogen or a methyl group and $R^x$ represents, when R is methyl, a primary or secondary alkyl group of 5 to 18 carbon atoms, or, when R is hydrogen, an alkyl group of not over 18 carbon atoms and, preferably, from 2 to 12 carbon atoms.

The copolymer may also include vinyl compounds having the general formula:

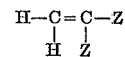

wherein Y may be selected from the group consisting of alkyl, hydrogen, halides, nitriles, carboxyl functions and amides. The copolymer may further include a vinyl alkyl ester having the general formula:

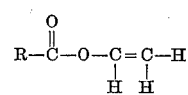

wherein R is an alkyl group having from 2 to 18 carbon atoms and can be normal or branched. Other monomers which may be included in the copolymer are generally described as polymerizable α, β-unsaturated carboxylic acids and, more specifically, derivatives of tetrahydrophthalic, acrylic, methacrylic, maleic, itaconic and crotonic acids and esters; also, cyclohexene and the synthetic rubber derivative, butadiene, having the general formula:

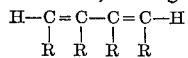

wherein R is H or an alkyl group.

The resulting suspension containing the selected copolymer is then applied to a vinyl film substrate which is comprised essentially of polyvinylchloride and an organic plasticizer. The continuous phase of the suspension which floats the selected copolymer or copolymers is substantially incompatible with and has little affinity for the plasticizer of the vinyl film. Since the migration of the plasticizer and the residual external phase is substantially prevented, the interface established between the vinyl and adhesive layers when they first contact is maintained essentially independent of aging and the fluid flow properties which previously existed between the adhesive and vinyl layers are substantially eliminated; thus, the only interaction remaining between the two contiguous layers is the adhesiveness of the adhesive suspension to the vinyl.

The continuous phase of this invention is deionized water; however, the particle suspending medium may be liquids other than water, such as heptane which is a poor solvent and a mediocre suspending medium. The aqueous emulsion comprising water and the suspended copolymer has advantages over other emulsion and solution systems in that water is basically inexpensive and the danger of fire is substantially reduced. Various emulsifying agents may be used which enhance and make possible the emulsion polymerization and it is contemplated that both anionic and nonionic agents are to be employed in order to achieve better shelf stability; however, where shelf stability does not appear to be any problem, only the anionic compounds are necessary.

The nonionic emulsifying agents of this invention include alkylene oxide adducts such as products of phenol and ethylene oxide reaction condensation products with an organic radical containing compound which possesses a functional group condensible with a terminal hydroxyl group to form an ether. A specific nonionic emulsifying agent of this type is nonylphenol modified with ethylene oxide.

The aqueous emulsion also contains a nonionic protective colloid which prevents the suspended particles from coagulating with foreign matter. Such synthetic protective colloids include polyvinyl alcohol, polyacrylic acid, polymethacrylic acid, hydroxyethyl cellulose, methyl cellulose and other cellulose ethers and a vinyl ether maleic anhydride copolymer. Natural colloids may also be used, a representative being gum tragacanth or casein.

Various anionic emulsifying agents may be used and included in the following groups are those especially adapted for use in this invention. Such groups are amine or alkali metal salts of dodecyl diphenyl ether disulfonic acid; alkali metal salts of alkyl or aryl sulfonic acids; half and full esters of sulfonated succinic acid and their salts; amine and alkali metal salts of alkyl sulfates which contain at least 8 carbon atoms; amine and alkali metal salts of alkyl sulfonates which contain at least 8 carbon atoms; long chain sulfinated or unsulfonated carboxylic acids; and sulfonated nonionic emulsifiers.

While this invention primarily contemplates the use of anionic emulsifying agents, amphoteric emulsifying agents may be effectively substituted therefor. Such amphoteric compounds include n-cocobeta amino propionic acid, fatty acid esters of alkanolamines, amino acids, amino sulfinic acids and partial sodium salts of N-lauryl beta amino dipropionate.

The free radical catalyst which is used for initiating and sustaining the polymerization of the monomeric substances suspended in the continuous phase may or may not include a Redox catalyst depending upon the desired temperature of the reaction medium. It is preferred that the catalyst be soluble in the continuous phase and it has been found that several peroxides including ammonium persulfate, sodium persulfate and potassium persulfate are excellent catalysts. Other free radical catalyst compounds including other peroxides which may be substituted for the aforementioned are hydrogen peroxide, t-butyl hydroperoxide, benzoyl peroxide, azobisisobutyrlnitrile, methyl ethyl ketone peroxide, perborates, percarbonates, peralkanoates and cumene hydroperoxide. Where the Redox system is to be employed, one of the following compounds may be used in addition to the selected free radical catalyst; such compounds include sodium metabisulfite, sodium sulfite, sodium sulfoxylate formaldehyde, those having metallic ions such as ferrous sulfate, hydrazine, soluble sulfites such as the hydrosulfites and the bisulfites, the thiosulfates and soluble tertiary amines.

The molecular weight and the intrinsic viscosity of the copolymer which is a function of molecular weight are controlled by means of a chain transfer agent which may be an aliphatic mercaptan having from 4 to 14 carbon atoms. More specifically, the aliphatic mercaptans which were found to be especially useful in this invention include t-butyl mercaptan, n-octyl mercaptan and N-decyl mercaptan. Occasionally, the omission of the chain transfer agent may be desirable; however, such an omission may not be made without altering the to-be-described process. The alternative process will also hereinafter be described.

The pH of the colloidal suspension may be adjusted by any suitable buffering agent which does not interfere with the formation of free radicals, such as sodium acetate, sodium dihydrogen phosphate, ammonium carbonate and sodium bicarbonate.

The intrinsic viscosity of the adhesive is most important for if it is too low, all dimensional stability in the vinyl will be lost and if the adhesive intrinsic viscosity is too high, the exposed surface is not tacky and there is a loss in peel strength. The viscosity must therefore be controlled so as to provide an adhesive which is sufficiently tacky and which is adapted to dimensionally stabilize the vinyl substrate when the same is applied to a surface. Intrinsic viscosity is a function of reduced viscosity, inherent viscosity and the concentration of the polymer solution. These variables may be determined by the following procedure. The polymer emulsion in the amount of 50 g. is placed in a 150 ml. flask to which is added 2 g. of a mixed bed ion exchange resin (H—OH). This resin removes both the positively and negatively charged ions in the emulsion which are harmful to the viscosity determination. This mixture is thoroughly agitated anl is filtered through glass wool into a 4 oz. jar. A dropping bottle is filled approximately one-half full with the treated emulsion and the nonvolatile content thereof is determined. Next, one gram of the treated emulsion is weighed into a 100 ml. flask to which 25 ml. of glacial acetic acid is added, this mixture being shaken until the polymer dissolves in the acetic acid. After the polymer has dissolved in the acid, the resulting solution is diluted with glacial acetic acid until the liquid reaches the 100 ml. mark whereupon the volumetric flask and contents are placed into a constant temperature bath which is maintained at 25° C. and is allowed to come to equilibrium. A second volumetric flask containing about 100 ml. of glacial acetic acid is placed in the constant temperature bath and allowed to come to the equilibrium temperature of 25° C. The viscometer used for this determination is thoroughly cleaned by rinsing it two times with distilled water and then with acetone whereupon it is allowed to dry. The solvent flow time ($T_0$) is determined by pipetting 10 ml. of glacial acetic acid into the viscometer from the acid containing flask and recording the flow time. The runs are repeated until three values are obtained which did not vary by more than 0.20 seconds. The solution flow time (T) is determined after the viscometer is cleaned as taught above by pipetteing 10 ml. of polymer solution into the viscometer and recording the flow time in the same manner as it was recorded for the solvent. Once the flow time of the solvent, $T_0$, and the polymer solution, T, have been recorded, intrinsic viscosity is calculated by the following series of equations:

Sample Weight × Nonvolatile Content = Concentration (g./dl.)

$$\frac{\text{Solution Time (T)}}{\text{Solvent Time } (T_0)} = \text{Relative Viscosity}$$

Specific Viscosity = Relative Viscosity − 1

$$\text{Reduced Viscosity (dl./g.)} = \frac{\text{Specific Viscosity}}{\text{Concentration}}$$

$$\text{Inherent Viscosity (dl./g.)} = \frac{\text{In Relative Viscosity}}{\text{Concentration}}$$

$$\text{Intrinsic Viscosity (dl./g.)} = \frac{\text{Reduced Viscosity} + \text{Inherent Viscosity}}{2}$$

The 180° peel strength data obtained on the examples in the application were obtained using an Instron Tensile Tester. One by six inch strips of vinyl chloride film, coated with the desired amount of adhesive are placed on polished stainless steel plates, suitably cleaned, and a 4.5 pound weighted roller passed over the strip, once forward and then returned, at a rate of approximately twelve inches per minute. The strips are left in contact with the substrate for 24 hours whereupon a 2 inch length of the strip is peeled back on itself at 180° on the Instron using a separation rate of 12 inches per minute, a chart speed of 12 inches per minute, and a full scale load of five pounds. The area under the resulting curve is automatically integrated and the force in inch-pounds computed and expressed as the peel strength in inch pounds.

To prepare the adhesive emulsion of this invention, a protective colloid in the amounts varying from 0.7 to 6.0% based on the weight of the monomer added is dissolved in a quantity of deionized water. The water controls the amount of nonvolatile content in the emulsion and for this invention sufficient water should be present which will yield a final nonvolatile content of from 30% to 50% of the total. The amount of protective colloid added to the deionized water substantially affects the stability of the suspended particles; thus, it is imperative that the proper quantity be used. The protective colloid is the first element added to the deionized water in order to prevent reaction upon the addition of the other emulsifiers. The remaining anionic and nonionic emulsifiers are next dissolved in the deionized water in the amounts ranging from 2.5% to 9.0% based on the weight of the monomer; also, the buffering or pH controlling agent is added in small amounts substantially at the same time.

The monomer mixture is prepared in a second container and includes at least one acrylic ester which adapts the resulting copolymer to be soft and tacky. Monomers other than acrylates which may include the vinyl group may be added which contribute to the cohesive strength of the adhesive polymer. Small amounts of unsaturated acids may also be included. The amount of each monomer added depends largely upon the desired ultimate characteristics of the copolymer; however, it has been found that from 50% to 85% of the acrylic esters, from 10% to 50% of the vinyl monomers and from 1% to 5% of the unsaturated acids based on the weight of the total monomeric charge have been especially effective in producing an adhesive copolymer having good peel strength and dimensional stability. The desired quantity of the chain transfer agent is added to the monomer mixture which is generally a mercaptan. Upon the thorough mixing of the monomer, 20% of the same is drained into the first receptacle which contains the emulsifiers. The initial monomer charge may vary from 0 to 50% of the total for where more than 50% is added initially the uncontrollable exothermic reaction makes it most difficult to handle. To initiate and sustain the polymerization reaction, a small quantity of deionized water which is held by a third receptacle is charged with a quantity of a selected peroxide catalyst whereupon 20% of this solution is added to the first receptacle which has previously been charged with 20% of the above-mentioned monomer mixture. Where it is necessary or desirable to eliminate the chain transfer agent, the mercaptan, the quantity of the emulsifiers in the first receptacle is doubled and approximately 90% of the catalyst solution is to be charged thereto initially.

The remaining 80% of the monomer mixture and the remaining 80% of the catalyst solution are poured into separate addition funnels and are maintained substantially at room temperature. The colloidal suspension in the first receptacle is heated to approximately 82° C. with the temperature range being from 40° C. to 90° C. Immediately upon heating the colloidal suspension in the first receptacle to approximately 82° C., the monomer mixture and the catalyst solution are simultaneously added thereto at such a constant rate that the addition is completed within from 1 to 6 hours and preferably 4 hours depending on the molecular weight range desired. It should be noted that if the mercaptan transfer agent is present in the system, the faster the monomer mixture is added the lower the molecular weight and the resulting intrinsic viscosity will be. However, where the mercaptan is not present, the converse is true for the faster the monomer mixture is added, the higher the molecular weight will be.

When approximately two-thirds of the monomer mixture has been added to the first receptacle, from 1% to 5% based on the weight of the monomers of a polymerizable α,β-unsaturated carboxylic acid or a combination thereof is added directly to the monomer addition funnel and mixed therewith without interrupting the rate of flow of the monomer mixture into the first receptacle. Unsaturated carboxylic acids of this type enhance the adhesive copolymer's shear stability.

To facilitate the polymerization of the monomers, the first receptacle is provided with a conventional propeller apparatus which continuously mixes the colloidal suspension contained therein. The temperature of the first receptacle during the polymerization of the monomer additives is maintained preferably between 85° C. and 90° C.; however, the temperature may fluctuate between 70° C. and 98° C. without adversely affecting the polymerization process. Since the polymerization process is basically exothermic, care must be taken not to overheat the suspension upon the addition of the monomer mixture. After the monomer mixture and the catalyst solution have been added to the first receptacle, the temperature thereof should be maintained at the reaction temperature for at least 30 minutes to allow for the substantial polymerization of the monomer additives whereupon the resulting colloidal suspension is allowed to cool to room temperature which generally ranges from 20° C. to 25° C. The pH of the resulting colloidal suspension should be approximately 4.7 and may range between 4 and 5 without adversely affecting the same and the intrinsic viscosity is between 0.7 and 1.0 with 0.80 to 0.85 being preferred.

The resulting aqueous emulsion produced by the above-mentioned general process is in a condition to be applied to a vinyl film or the like and function as a pressure sensitive adhesive. However, vinyl film is most difficult to wet with most fluids including the aqueous emulsion of this invention; therefore, once the aqueous emulsion has been prepared, it is combined with an emulsion post stabilizer which is water soluble and which overcomes the resistance of the vinyl film to wetting thus allowing a thin layer of the emulsion to be coated thereon. Any one of several wetting agents may be employed; however, it has been found that selected polyether acetic acids or salts thereof are far superior to the other more common wetting agents. The polyether acetic acid or salt contemplated for use in this invention is represented by the general formula:

$$RO(CH_2COO)Z$$

wherein R denotes a hydrocarbon radical having from 12 to 16 carbon atoms, which radical may be alkyl, cycloalkyl, aralkyl, aryl or heterocyclic, and which may be interrupted by hetero atoms or hetero atom groups, and which may be substituted in any way, but in particular with hydroxy groups; Y denotes a chain of one to five ethenoxy groups; and Z denotes a cation such as hydrogen, sodium, potassium and ammonium. The polyether acetic acid of this invention may be prepared according to the general method disclosed in U.S. Pat. 2,623,900.

The polyether acetic acid described above is to be added to the completed aqueous emulsion of this invention in quantities ranging from 2% to 10% based on the weight of the monomer. Where this additive is charged in quantities of less than 2%, the aqueous emulsion does not effectively wet the vinyl film and where added in quantities greater than 10%, it interferes with and detracts from the adhesive characteristics of the emulsion.

The resulting bulk viscosity of the composite aqueous emulsion should be maintained between 600 and 20,000 centipoises, the viscosity being determined by using the Brookfield viscometer. The viscosity should be as high as 600 centipoises in order to provide a suspension the thickness of the coating of which may be controlled when applied to the vinyl film. The upper limits of viscosity cannot be said to be critical for the emulsion may be spread on a vinyl film at almost any elevated viscosity.

The pressure sensitive adhesive of this invention may be applied to almost any film or substrate and will perform accordingly; however, it has special utility when applied to vinyl tapes or tapes which have a relatively high plasticizer, either monomeric or polymeric, content. A typical film which has a high polymeric plasticizer content and which has a low linear shrinkage is comprised of 100 parts of polyvinyl chloride resin, 35 parts of an ester type polymer plasticizer, 5 parts of a monomeric plasticizer such as dioctyl phthalate, 10 parts of calcium carbonate, 2 parts of barium-cadmium, 0.2 part of zinc organic and 0.5 part of steric acid. The film samples for testing purposes have a thickness of about 3 mils.

The adhesive properties of the pressure sensitive adhesive were tested by applying the same by means of an applicator to the vinyl film ranging in quantities from 0.006 gram per square inch to 0.015 gram per square inch, the preferred being 0.009 gram per square inch. The coated film is placed in an oven to remove the excess moisture in the adhesive and upon the completion of the same, the pressure sensitive vinyl film is adapted to be used or stored. The water content remaining in the adhesive ranges from 1% to 12% based on the weight of the monomer. If the film is to be stored, a layer of release paper is mounted on the tacky surface and the film is rolled into tubes. The release paper generally consists of a paper which may or may not have its surfaces modified with polyethylene and which has coated on this surface a crosslinkable silicone polymer.

This invention is also to include the method of coating embossed vinyl film which ordinarily cannot be used as a film adherent for a pressure sensitive adhesive. Embossed vinyl film cannot be subjected to elevated temperatures for the deformations therein have the tendency to resume their prior undeformed shape. To date, pressure sensitive adhesives are not adaptable to coat release paper for the adhesive will not wet the paper but forms beads thereon. The pressure sensitive adhesive of this invention in combination with the polyether acetic acid post emulsion stabilizer which is thickened to a sufficiently high viscosity readily wets and adheres to the release paper and the release paper is not adversely affected by the oven. Therefore, the release paper is coated with the aqueous emulsion and is run through an oven whereupon the embossed vinyl film is laid on the adhesive surface of the release paper and forced into intimate contact with the pressure sensitive adhesive. Since the surface of the vinyl film has a higher energy than does the surface of the release paper, the pressure sensitive adhesive will preferentially adhere to the embossed vinyl film upon the separation of the vinyl film from the release paper.

The following examples illustrate the improved dimensional stability of vinyl film when used as an overlay and when held thereon by means of the pressure sensitive adhesive as illustrated and described herein. These examples are given for illustrative purposes and it will be understood that this invention is not to be confined to these examples. In the examples, all parts and percentages are given on a weight basis unless otherwise indicated.

EXAMPLE I

A deionized water diluent in the amount of 310 ml. was prepared in a first receptacle having 3.0 grams of hydroxyethyl cellulose dissolved therein. Next, 1.25 grams of nonionic nonylphenol modified with 10.5 moles of ethylene oxide, 7.50 grams of anionic sodium dodecyl diphenyl ether disulfate and 0.50 gram of sodium bicarbonate were dissolved therein.

In a second receptacle, a monomeric mixture was prepared containing 80.0 grams of vinyl acetate, 110.0 grams of 2-ethylhexylacrylate and 0.35 gram of N-dodecyl mercaptan. Of this monomeric mixture, 20% was added directly to the water solution and thoroughly mixed therewith. The remaining 80% of the monomeric mixture was transferred from the second receptacle to a first addition funnel.

A catalyst solution was prepared in a third receptacle by charging 50 ml. of deionized water with 0.80 gram of potassium persulfate. Approximately 20% of this solution was added to the first receptacle simultaneously with the addition thereto of 20% of the monomeric mixture. The remaining 80% of the catalyst solution was transferred to a second addition funnel.

By thoroughly mixing the elements contained in the first receptacle, a colloidal suspension resulted which was heated to approximately 82° C. whereupon the remaining 80% of the monomer mixture and catalyst solution were simultaneously added thereto at such a constant rate that the addition thereof was completed in four and one half hours. When approximately two-thirds of the monomer mixture had been added to the first receptacle, the remaining one-third was charged with 1.0 grams of acrylic acid and 2.0 grams of methacrylic acid and was mixed therewith without interrupting the rate of flow of the monomer mixture into the first receptacle.

The temperature of the first receptacle during the addition of the monomeric mixture and the catalyst solution was maintained between 85° C. and 90° C. and the colloidal suspension was agitated for 30 minutes after the additions had been completed within the temperature range. The colloidal suspension was then allowed to cool to room temperature or to about 23° C. whereupon 16.8 grams of the surfactant, polyether acetic acid, was thoroughly mixed therewith. The pH of the resulting colloidal suspension or pressure sensitive adhesive was 4.7 and the intrinsic viscosity as determined by the method as therein set forth was 0.83.

The adhesive was tested by coating a 3 inch square strip of plasticized polyvinylchloride film of 3 mils thickness with 0.008 gram of adhesive per square inch. The adhesive coated film was heated in a circulating air oven for 1 minute at 140° C. whereby the resulting nonvolatile content of the adhesive was 88%. This film sample was then applied to a varnished board and the edges were marked with a wax pencil. After maintaining the sample at 43° C. for ten days, which is equivalent to room temperature for 3 months, the sample was observed and tested. There was no shrinkage in either the machine or the lateral direction.

EXAMPLE II

The procedure according to Example I was substantially followed wherein the first receptacle included a solution consisting of 192 ml. of deionized water, 3.8 grams of a methylvinylether-maleic anhydride copolymer, 1.2 grams of a nonylphenoxy-polyethoxyethanol having about 10 ether groups, 7.2 grams of sodium dodecyl diphenyl ether disulfonate and 0.5 grams of sodium bicarbonate.

The second receptacle contained a mixture of 80.0 grams of vinyl acetate, 110 grams of 2-ethylhexylacrylate and 0.35 grams of N-dodecyl mercaptan of which .19 g. was added to the first receptacle.

The third receptacle contained the catalyst solution which consisted of 0.8 gram dissolved in 50 ml. of deionized water of which 10 ml. was added to the first receptacle whereupon the contents of the first receptacle were heated to 82° C.

The remainder of the monomer mixture and catalyst solution was continuously added over a 4 hour period to the first receptacle and the temperature of the emulsion in the first receptacle was maintained between 87° C. and 89° C. during the additions. Upon the completion of the monomer and catalyst additions, the resulting emulsion was maintained at the reaction temperature for 30 minutes then cooled to room temperature. The nonvolatile content of the emulsion had an intrinsic viscosity of 0.82. After cooling to room temperature, 11.2 grams of a polyether acetic acid salt having an active content of approximately 67% and 11.2 grams of deionized water were added to stabilize the emulsion and to aid in the spreading of the emulsion on a polyvinylchloride film.

A three square inch sample of polyvinylchloride film was coated with 0.0081 gram per square inch of the emulsion and heated in a circulating air oven for 1 minute at 140° C. The sample was placed on a varnished board and maintained at 43° C. for ten days. No shrinkage was evident after this period of testing and the peel strength was 7.0 in./lbs.

EXAMPLE III

The emulsion of this example was prepared according to the procedure of Example II except for the following:

(1) 52.8 grams of methyl methacrylate was substituted for the 80.0 grams of vinyl acetate;
(2) the hydroxyethyl cellulose was omitted;
(3) the amount of deionized water in the first receptacle was increased to 366.0 ml.;
(4) the polyether acetic acid salt added was increased to 33.4 grams; and
(5) the polyvinylchloride film was coated with 0.0090 grams per inch square of the emulsion.

No shrinkage was noted after ten days at 43° C. and the sample had a peel strength of 3.0 in./lb.

EXAMPLE IV

The procedure of Example III was repeated with the exception that 52.8 grams of styrene was substituted for the 52.8 grams of methyl methacrylate.

There was no shrinkage after testing and the peel strength was 3.5 in./lb.

EXAMPLE V

The procedure of Example III was repeated with the following exceptions:

(1) only 37 grams of methyl methacrylate was charged;
(2) 153 grams of butyl acrylate was substituted for the 2-ethylhexyl acrylate; and
(3) the emulsion was coated on the polyvinyl chloride film at a level of 0.0089 gram per square inch.

No shrinkage was observed and the peel strength was 4.7 in./lb.

EXAMPLE VI

The procedure of Example III was repeated with the following exceptions:

(1) 59.3 grams of vinyl acetate was substituted for the methyl methacrylate;
(2) 130.7 grams of butyl acrylate was substituted for the 2-ethylhexyl acrylate; and
(3) the emulsion was coated on the polyvinyl chloride film at a level of 0.0089 gram per square inch.

No shrinkage was observed and the peel strength was 4.3 in./lb.

EXAMPLE VII

The procedure of Example VI was repeated except that 59.3 grams of styrene was substituted for the vinyl acetate and the polyvinyl chloride film was coated with the emulsion at a level of 0.010 gram per square inch.

No shrinkage was observed and the peel strength was 2.9 in./lb.

EXAMPLE VIII

The procedure of Example III was repeated except that 29.5 grams of styrene was substituted for the methyl methacrylate and 160.5 grams of isobutyl acrylate was substituted for the 2-ethylhexyl acrylate.

No shrinkage was observed and the peel strength was 3.2 in./lb.

EXAMPLE IX

The process as outlined in Example II was substantially followed. The amount of the methylvinylether-maleic anhydride copolymer added was increased to 11.5 grams, the amount of deionized water added to the first receptacle was increased to 525 ml. and the period of time of adding the monomer mixture and the copolymer solution was decreased from 4 hours to 3¾ hours.

This example includes the extra step of adding to the monomer mixture when approximately two-thirds of the same had been added to the first receptacle 1.0 gram of acrylic acid and 2.0 grams of methacrylic acid without interrupting the flow of the monomer mixture into the first receptacle.

A 3 square inch sample of a polyvinyl chloride film was coated with 0.0078 gram per square inch of the resulting emulsion having an intrinsic viscosity of 0.82 and heated in a circulating air oven for 1 minute at 140° C. The sample was then placed on a varnished board and maintained at 43° C. for ten days. No shrinkage was evident after this period of testing and the peel strength was 8.4 in./lb.

EXAMPLE X

The procedure of Example IX was repeated except that 2.6 grams of acrylamide was substituted for the methacrylic and acrylic acids and 3.0 grams of hydroxyethyl cellulose was substituted for the methylvinylether-maleic anhydride copolymer. A 3 inch square sample of polyvinyl chloride was coated with the resulting emulsion having an intrinsic viscosity of 0.82 at a level of 0.0095 gram per square inch and maintained at 43° C. for ten days. No shrinkage was evident after this period of testing and the peel strength was 8.7 in./lb.

EXAMPLE XI

The procedure of Example X was repeated except that 4.8 grams of itaconic acid was substituted for acrylamide. No shrinkage was evident after maintaining the sample at 43° C. for ten days.

EXAMPLE XII

An aqueous emulsion was prepared consisting of 250 ml. of deionized water, 3.0 grams of hydroxyethyl cellulose, 1.0 gram of a nonylphenoxypolyethoxyethanol having about 10 ether groups, 5.0 grams of sodium dodecyl diphenyl ether disulfonate, 0.5 gram of sodium bicarbonate, 80.0 grams of vinyl acetate and 0.35 gram of N-dodecyl mercaptan. With constant stirring, the emulsion was heated to 68° C.

A second emulsion was prepared consisting of 100 ml. of deionized water, 0.25 gram of nonylphenoxypolyethoxyethanol having about 10 ether groups, 2.5 grams of sodium dodecyl diphenyl ether disulfonate, 110 grams of 2-ethylhexyl acrylate and 0.8 gram of potassium persulfate. The second emulsion was fed to the first emulsion at a constant rate and over a period of 3 hours and the reaction temperature was maintained between 85° C. and 88° C. After approximately two-thirds of the second emulsion had been fed to the first emulsion, 3.0 grams of acrylic acid were added to the second emulsion, with stirring and without interrupting the addition process.

After the second emulsion had been fed into the first emulsion, the reaction temperature was maintained for 30 minutes whereupon the combined emulsion was allowed to cool to room temperature. The intrinsic viscosity of the emulsion was 0.80.

A mixture of 16.7 grams of a polyether acetic acid salt having an active content of about 67% and 8.4 grams of deionized water was added to the emulsion to induce spreading on a polyvinyl chloride film. A 3-inch square polyvinyl chloride film sample was coated with the emulsion at a level of 0.010 gram per square inch and maintained at 43° C. for 10 days. No shrinkage was observed after this period of testing and the peel strength was 8.6 in./lb.

EXAMPLE XIII

The procedure of Example XII was repeated except the acrylic acid was omitted and the emulsion was coated on the polyvinyl chloride film at a level of 0.0092 gram per square inch. The intrinsic viscosity of the emulsion was 0.82, no shrinkage was observed and the peel strength was 8.7 in./lb.

EXAMPLE XIV

A solution was prepared of 3.0 grams of hydroxyethyl cellulose, 2.5 grams of a nonylphenoxypolyethoxyethanol having about 10 ether groups, 15.0 grams of sodium dodecyl diphenyl ether disulfonate and 0.5 gram of sodium bicarbonate in 300 ml. of a deionized water. To this solution was added while stirring the same, 19.1 grams of a mixture of 80.0 grams of vinyl acetate, 110.0 grams of 2-ethylhexyl acrylate and 1.0 gram of bis(tridecyl)ester of sodium sulfosuccinic acid. A catalyst solution was prepared by charging 50 ml. of deionized water with 0.80 gram of potassium persulfate whereupon 45 ml. of the same was added to the emulsion and the emulsion was heated to a temperature of 75° C. Simultaneously with the addition of the catalyst solution, the remainder of the monomer mixture was added at a continuous rate over a 90 minute period while maintaining the reaction temperature between 82° C. and 85° C.

When approximately two-thirds of the monomer mixture had been added, a mixture of 2.0 grams of methacrylic acid and 1.0 gram of acrylic acid was added to the remaining monomer mixture with stirring and the addition continued to completion without interruption. When the monomer addition was complete, the remaining 5.0 ml. of catalyst solution was added and the temperature was held between 82° C. and 85° C. for 30 minutes to substantially complete the polymerization of the monomer. The polymeric content of the emulsion had an intrinsic viscosity of 0.94. The emulsion was allowed to cool to room temperature upon the completion of the polymerization process and was charged with 16.8 grams of a polyether acetic acid, having an active content of about 67%, and 8.4 grams of deionized water to stabilize the emulsion and to induce spreading of the emulsion on the polyvinyl chloride film.

A 3-inch sample of polyvinyl chloride film coated with this emulsion at a level of 0.0081 gram per square inch showed no mounted shrinkage after ten days at 43° C. and the peel strength was 7.7 in./lb.

EXAMPLE XV

A primary solution was prepared by dissolving in 300 ml. of water 3.0 grams of hydroxyethyl cellulose, 1.25 grams of a nonylphenoxypolyethoxyethanol containing about ten ether groups, 7.5 grams of sodium dodecyl diphenyl ether disulfonate, 0.5 grams of sodium bicarbonate and 0.6 gram of potassium persulfate. To this solution was added 19.0 grams of a mixture containing 80.0 grams of vinyl acetate, 110.0 grams of 2-ethylhexyl acrylate and 0.35 grams of N-dodecyl mercaptan. Also, 17 ml. of a solution of 50 ml. of deionized water and an initiator, sodium meta bisulfite was added to the primary solution. This solution was then heated to 70 C. The remainder of the initiator solution and the monomer mixture was added at a constant rate over a four and one-half hour period and the reaction temperature was maintained between 70° C. and 75° C. during the addition.

After approximately two-thirds of the monomer mixture had been added, a mixture of 2.0 grams of methacrylic acid and 1.0 gram of acrylic acid was added to the remaining one-third thereof while the same was constantly being stirred and without interrupting the flow of monomer into the primary solution. When the monomer and initiator additions were completed, the resulting emulsion was held at the reaction temperature for thirty minutes, then cooled to room temperature. A solution of 16.7 grams of a polyether acetic acid salt having an active content of about 67% and 16.7 grams of deionized water was added to the emulsion to induce spreading of the emulsion on a polyvinyl chloride film.

A three inch square sample was coated with the emulsion at a level of 0.0095 gram per square inch and heated in a circulating air oven for one minute at 140° C., the resulting non-volatile content of the adhesive was 89%. The film sample was then applied to a varnished board and was maintained at 43° C. for ten days. The intrinsic viscosity of the nonvolatile content of the adhesive was 0.57 and the sample showed a 0.004 inch shrinkage after the testing period. The peel strength of the sample remained high at 13.3 in./lb.

EXAMPLE XVI

The procedure according to Example I was followed with the exception that the thickened adhesive emulsion was applied to a three square inch of release paper having a crosslinkable silicon polymer surface coating. The release paper with the emulsion coated thereon was heated in a circulating air oven for one minute at 140 C. whereupon it was placed in intimate contact with a polyvinyl chloride film sample. Upon separating the release paper from the film sample, all of the adhesive was transferred to the film sample and the film sample was placed on a varnished board and maintained at 43° C. for ten days. No film shrinkage resulted and the peel strength was 7.3 in./lb.

What is claimed is:

1. A pressure sensitive adhesive emulsion for coating vinyl form, said emulsion being formulated in a manner effective when applied in end use to substantially inhibit contraction of said film in both machine and lateral directions when applied to a rigid substrate and comprising an aqueous medium; particles suspended in said aqueous medium, approximately 66% by weight of said particles being comprised of a 2-ethyl-hexylacrylate-vinyl acetate copolymer and the remaining 34% by weight being comprised of a 2-ethylhexylacrylate-acrylic acid-methacrylic acid-vinyl acetate copolymer, said copolymer of 2-ethylhexylacrylate-vinyl acetate being comprised of per hundred parts by weight approximately 42 parts by weight of vinyl acetate and 58 parts by weight of 2-ethylhexylacrylate, said copolymer of 2-ethylhexylacrylate-acrylic acid-methacrylic acid-vinyl acetate being comprised of per hundred parts by weight 57 parts by weight of 2-ethylhexylacrylate, 0.5 parts by weight of acrylic acid, 1 part by weight of methacrylic acid and 41.5 parts by weight of vinyl acetate, said emulsion having a pH of from 4.0 to 5.0 and an intrinsic viscosity of from 0.70 to 0.90 dl./gr. when measured in acetic acid solvent at 25° C., said aqueous medium including an emulsion post stabilizer having the general formula:

$$ROYCH_2COOZ$$

wherein R is a hydrocarbon radical having from 12 to 16 carbon atoms, which radically may be alkyl, cycloalkyl, aralkyl, amyl and heterocyclic; Y is a chain of from one to five ethenoxy groups; and Z is a cation selected from the class consisting of hydrogen, sodium, potassium and ammonium.

2. A pressure sensitive emulsion adhesive as claimed in claim 1 wherein said emulsion post stabilizer is added in the range of 2% to 12% based on the weight of the monomers, said emulsion being adapted to being thinly and continuously coated on vinyl film in the range of .006 gram per square inch to .015 gram per square inch and being composed after drying of at least 87% nonvolatile by weight of the total added.

References Cited
UNITED STATES PATENTS

| | | | |
|---|---|---|---|
| 2,973,286 | 2/1961 | Ulrich | 117—122(PA) |
| 3,222,419 | 12/1965 | Jubilee et al. | 260—29.6(RW) |
| 3,258,443 | 6/1966 | Cantor et al. | 260—29.6(TA) |
| 3,269,994 | 8/1966 | Horn et al. | 260—29.6(TA) |
| 3,307,690 | 3/1967 | Bond et al. | 117—122(PA) |
| 3,325,459 | 6/1967 | Gander | 117—122(PA) |
| 2,623,900 | 12/1952 | Hofer | 260—535 |

MURRAY TILLMAN, Primary Examiner

W. J. BRIGGS, SR., Assistant Examiner

U.S. Cl. X.R.

117—122, 138.8; 156—327; 260—80.8, 80.81, 901

PO-1050
(5/69)

UNITED STATES PATENT OFFICE
CERTIFICATE OF CORRECTION

Patent No. 3,547,852          Dated December 15, 1970

Inventor(s) Robert L. Burke, Jr.

It is certified that error appears in the above-identified patent and that said Letters Patent are hereby corrected as shown below:

Column 2, lines 52, 53 and 54, "Z" in formula should be '

Column 4, line 48, "anl" should be "and"

Column 7, line 6, "hydroxy" should be "hydroxyl"

Column 8, line 58, "therein" should be "herein"

Column 12, line 51, "form" should be "film"

Signed and sealed this 13th day of July 1971.

(SEAL)
Attest:

EDWARD M. FLETCHER, JR.
Attesting Officer

WILLIAM E. SCHUYLER, JR
Commissioner of Patents